United States Patent
Seo et al.

(10) Patent No.: US 12,444,536 B2
(45) Date of Patent: *Oct. 14, 2025

(54) DIELECTRIC CERAMIC COMPOSITION AND MULTILAYER CERAMIC CAPACITOR COMPRISING THE SAME

(71) Applicant: SAMSUNG ELECTRO-MECHANICS CO., LTD., Suwon-si (KR)

(72) Inventors: In Tae Seo, Suwon-si (KR); Kyung Sik Kim, Suwon-si (KR); Sea Hanna Doo, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 208 days.

This patent is subject to a terminal disclaimer.

(21) Appl. No.: 18/216,862

(22) Filed: Jun. 30, 2023

(65) Prior Publication Data

US 2023/0343518 A1 Oct. 26, 2023

Related U.S. Application Data

(63) Continuation of application No. 17/512,176, filed on Oct. 27, 2021, now Pat. No. 11,735,362, which is a
(Continued)

(30) Foreign Application Priority Data

Aug. 20, 2019 (KR) .................. 10-2019-0101517

(51) Int. Cl.
 *H01G 4/12* (2006.01)
 *C04B 35/468* (2006.01)
 *H01G 4/30* (2006.01)

(52) U.S. Cl.
 CPC ....... *H01G 4/1227* (2013.01); *C04B 35/4682* (2013.01); *H01G 4/30* (2013.01)

(58) Field of Classification Search
 CPC ....... H01G 4/1209; H01G 4/1227; H01G 4/30
 See application file for complete search history.

(56) References Cited

U.S. PATENT DOCUMENTS 7,446,997 B2   11/2008  Kaneda et al.
9,536,668 B2   1/2017   Shimada et al.
(Continued)

FOREIGN PATENT DOCUMENTS

CN    106915959 A    7/2017
CN    109671565 A    4/2019
(Continued)

OTHER PUBLICATIONS

Office Action issued Oct. 24, 2023 for corresponding Japanese Patent Application No. 2020-098950 (See English Translation).
(Continued)

*Primary Examiner* — Nathan Milakovich
(74) *Attorney, Agent, or Firm* — Morgan Lewis & Bockius LLP

(57) ABSTRACT

A dielectric ceramic composition and a multilayer ceramic capacitor comprising the same are provided. The dielectric ceramic composition includes a $BaTiO_3$-based base material main ingredient and an accessory ingredient, where the accessory ingredient includes dysprosium (Dy) and cerium (Ce) as first accessory ingredients. A total content of Dy and Ce is greater than 0.25 mol % and equal to or less than 1.0 mol % based on 100 mol % of the base material main ingredient.

20 Claims, 2 Drawing Sheets

Related U.S. Application Data continuation of application No. 16/788,063, filed on Feb. 11, 2020, now Pat. No. 11,302,475.

(56) References Cited

U.S. PATENT DOCUMENTS

| | | | |
|---|---|---|---|
| 9,984,825 | B2 | 5/2018 | Park et al. |
| 11,302,475 | B2 * | 4/2022 | Seo .................. H01G 4/1227 |
| 11,735,362 | B2 * | 8/2023 | Seo .................. C04B 35/4682 |
| | | | 501/137 |
| 2008/0030921 | A1 | 2/2008 | Kaneda et al. |
| 2011/0222205 | A1 | 9/2011 | Muraki et al. |
| 2013/0083449 | A1 | 4/2013 | Yoon et al. |
| 2013/0250478 | A1 | 9/2013 | Kim et al. |
| 2016/0155570 | A1 | 6/2016 | Shimada et al. |
| 2017/0186543 | A1 | 6/2017 | Park et al. |
| 2019/0115153 | A1 | 4/2019 | Park et al. |

FOREIGN PATENT DOCUMENTS

| | | |
|---|---|---|
| JP | H02-049308 A | 2/1990 |
| JP | 2008-042150 A | 2/2008 |
| JP | 2011-184279 A | 9/2011 |
| JP | 2013-79182 A | 5/2013 |
| JP | 2013-193955 A | 9/2013 |
| JP | 2016-102040 A | 6/2016 |
| JP | 2017-114759 A | 6/2017 |
| KR | 10-2008-0012178 A | 2/2008 |
| KR | 10-2016-0065012 A | 6/2016 |
| KR | 10-2017-0076310 A | 7/2017 |

OTHER PUBLICATIONS

Office Action issued Mar. 8, 2024 for Korean Patent Application No. 10-2019-0101517 (See English Translation).

U.S. Final Office Action dated Sep. 22, 2021 issued in U.S. Appl. No. 16/788,063.

U.S. Office Action dated Jun. 4, 2021 issued in U.S. Appl. No. 16/788,063.

U.S. Notice of Allowance dated Apr. 7, 2023 issued in U.S. Appl. No. 17/512,176.

U.S. Non-Final dated Jan. 25, 2023 issued in U.S. Appl. No. 17/512,176.

Chinese Office Action dated Aug. 3, 2022 issued in Chinese Patent Application No. 202010264305.9 (with English translation).

* cited by examiner

I-I'

DIELECTRIC CERAMIC COMPOSITION AND MULTILAYER CERAMIC CAPACITOR COMPRISING THE SAME

CROSS-REFERENCE TO RELATED APPLICATION(S)

This application is a continuation of U.S. patent application Ser. No. 17/512,176, filed on Oct. 27, 2021, which is a continuation of U.S. patent application Ser. No. 16/788,063, filed on Feb. 11, 2020 and issued as U.S. Pat. No. 11,302,475 issued on Apr. 12, 2022, and which claims benefit of priority to Korean Patent Application No. 10-2019-0101517 filed on Aug. 20, 2019 in the Korean Intellectual Property Office, the disclosures of which are incorporated herein by reference in their entireties.

BACKGROUND

Technical Field

The present disclosure relates to a dielectric ceramic composition having improved reliability and a multilayer ceramic capacitor including the same.

Description of Related Art

Generally, electronic components using a ceramic material such as a capacitor, an inductor, a piezoelectric element, a varistor, a thermistor, or the like, include a ceramic body formed of a ceramic material, internal electrodes formed in the body and external electrodes mounted on a surface of the ceramic body to be connected to the internal electrodes.

As there is a recent trend for electronic products to be miniaturized and multi-functionalized along with chip components, there is a requirement for multilayer ceramic capacitors which are smaller in size but which have greater capacity.

A method for both miniaturizing a multilayer ceramic capacitor and increasing the capacity thereof simultaneously is to reduce thicknesses of the internal dielectric layers and electrode layers to laminate a larger number of the layers. Currently, the thickness of the internal dielectric layer is about 0.6 μm, and there have been efforts to develop thinner dielectric layers.

Under such circumstances, ensuring reliability of dielectric layers is emerging as a major issue of dielectric materials. In addition, difficulties in managing quality and yield have become an issue due to increased degradation of insulation resistance of dielectric materials.

To resolve such problems, there is a need to develop a new method for ensuring high reliability with respect not only to a structure of a multilayer ceramic capacitor, but particularly to a composition of a dielectric.

When a dielectric composition having high permittivity and improving current reliability is secured, a thinner multilayer ceramic capacitor can be manufactured.

SUMMARY

An aspect of the present disclosure is to provide a dielectric ceramic composition having improved reliability and a multilayer ceramic capacitor including the same.

According to an aspect of the present disclosure, a dielectric ceramic composition includes a barium titanate (BaTiO$_3$)-based base material main ingredient and an accessory ingredient. The accessory ingredient includes dysprosium (Dy) and cerium (Ce) as first accessory ingredients. A total content of Dy and Ce is greater than 0.25 mol % and equal to or less than 1.0 mol % based on 100 mol % of the base material main ingredient.

According to another aspect of the present disclosure, a multilayer ceramic capacitor includes a ceramic body including dielectric layers and first and second internal electrodes disposed to face each other with respective dielectric layers interposed therebetween, and first and second external electrodes disposed on external surfaces of the ceramic body. The first external electrode is electrically connected to the first internal electrode, and the second external electrode is electrically connected to the second internal electrode, and the dielectric layers include dielectric grains including a dielectric ceramic composition. The dielectric ceramic composition includes a BaTiO$_3$-based base material main ingredient and an accessory ingredient, where the accessory ingredient includes Dy and Ce as first accessory ingredients. A total content of Dy and Ce is greater than 0.25 mol % and equal to or less than 1.0 mol % based on 100 mol % of the base material main ingredient.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
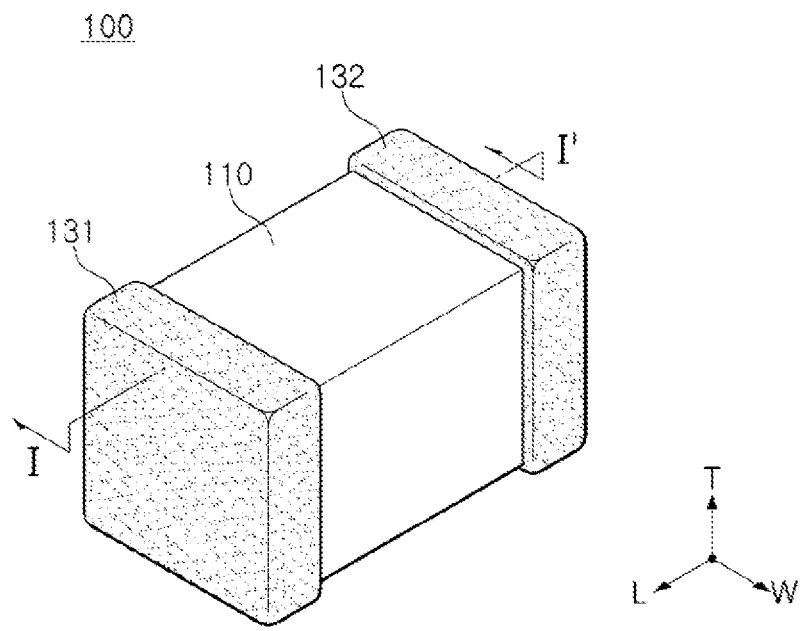
FIG. 1 is a schematic perspective view of a multilayer ceramic capacitor according to an embodiment.

Hereinafter, embodiments of the present disclosure will be described as follows with reference to the attached drawings. The present disclosure may, however, be embodied in many different forms and should not be construed as being limited to the embodiments set forth herein. Rather, these embodiments are provided so that the present disclosure will be thorough and complete, and will fully convey the scope of the present disclosure to those skilled in the art. In the drawings, the shapes and dimensions of elements may be exaggerated for clarity, and the same reference numerals will be used throughout to designate the same or like elements.

FIG. 1 is a schematic perspective view of a multilayer ceramic capacitor according to an embodiment.

Figure 2:
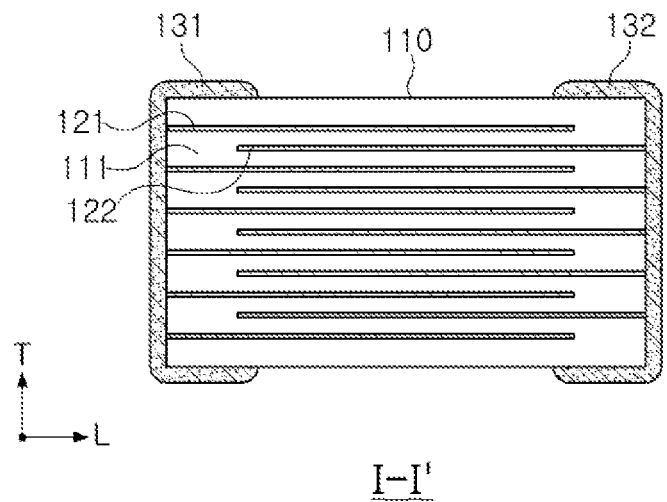
FIG. 2 is a cross-sectional view taken along line I-I' in FIG. 1.

FIG. 2 is a cross-sectional view taken along line I-I' in FIG. 1.

Referring to FIGS. 1 and 2, a multilayer ceramic capacitor 100, according to an embodiment, includes a ceramic body 110 including dielectric layers 111 and first and second internal electrodes 121 and 122 disposed to face each other with respective dielectric layers interposed therebetween, and first and second external electrodes 131 and 132 disposed on external surfaces of the ceramic body 110. The first external electrode 131 is electrically connected to the first internal electrode 121, and the second external electrode 132 is electrically connected to the second internal electrode 122.

In regard to the multilayer ceramic capacitor 100 according to an embodiment, the "length direction," "width direction," and "thickness direction" of FIG. 1 are defined as an "L" direction, a "W" direction, and a "T" direction, respectively. The "thickness direction" may be used in the same sense as a direction in which the dielectric layers are stacked up, for example, a "lamination direction."

Although not particularly limited, a configuration of the ceramic body 110 may be a rectangular cuboid shape as illustrated in the drawing.

A plurality of the first and second internal electrodes 121 and 122 formed inside the ceramic body 110 have one end exposed to one surface of the ceramic body 110 or the other surface thereof disposed opposite thereto.

The internal electrodes may include a first internal electrode 121 and a second internal electrode 122 having different polarities in pairs.

One end of the first internal electrode 121 may be exposed to one surface of the ceramic body, and one end of the second internal electrode 122 may be exposed to the other surface of the ceramic body disposed opposite thereto.

The first and second external electrodes 131 and 132 are formed on the one surface of the ceramic body 110 and the other surface disposed opposite thereto, respectively, and may be electrically connected to the internal electrodes.

Materials of the first and second internal electrodes 121 and 122 are not particularly limited, and may be a conductive paste containing at least one element selected from the group consisting of, for example, silver (Ag), lead (Pb), platinum (Pt), nickel (Ni) and copper (Cu).

The first and second external electrodes 131 and 132 can be electrically connected to the first and second internal electrodes 121 and 122, respectively, so as to generate capacitance. The second external electrode 132 may be connected to an electric potential different from that connected to the first external electrode 131.

A conductive material contained in the first and second external electrodes 131 and 132 is not particularly limited, but may include at least one element selected from the group consisting of nickel (Ni), copper (Cu) and alloys thereof.

Thicknesses of the first and second external electrodes 131 and 132 may be appropriately determined according to uses thereof, or the like, and are not particularly limited, but may be, for example, 10 μm to 50 μm.

According to an embodiment, a material forming the dielectric layers 111 is not particularly limited as long as sufficient capacitance may be obtained therewith, and is not particularly limited, and may be, for example, $BaTiO_3$ powder.

The material forming the dielectric layers 111 may include various additives, organic solvents, plasticizers, binders, dispersants, and the like, added to the $BaTiO_3$ powder, or the like.

The dielectric layers 111, in a sintered state, may be integrated in a single body such that boundaries between adjacent dielectric layers 111 may not be readily apparent.

The first and second internal electrodes 121 and 122 may be formed on the dielectric layers 111, and the internal electrodes 121 and 122 may be formed inside the ceramic body 110 by sintering while having one dielectric layer therebetween.

A thickness of the dielectric layer 111 may be optionally changed according to capacity design of the capacitor. A thickness of the dielectric layer in an embodiment after sintering may be 0.4 μm or less per layer.

Further, thicknesses of the first and second internal electrodes 121 and 122 after the sintering may be 0.4 μm or less per layer.

According to an embodiment, the dielectric layers 111 include dielectric grains including a dielectric ceramic composition. The dielectric ceramic composition includes a $BaTiO_3$-based base material main ingredient and an accessory ingredient, where the accessory ingredient includes dysprosium (Dy) and cerium (Ce) as the first accessory ingredients. A total content of Dy and Ce is greater than 0.25 mol % and equal to or less than 1.0 mol % based on 100 mol % of the base material main ingredient.

In order to develop a miniaturized multilayer ceramic capacitor having high capacity, there has recently been a need to develop a composition of the dielectric composition which allows high permittivity by enhancing domain wall motility when forming similarly sized-grains in the $BaTiO_3$-based base material main ingredient containing an additive.

In this regard, studies have shown that when a donor-type dopant composition is applied, a pinning source concentration in a lattice is lowered, leading to high domain wall motility.

By applying additives whose ion size is the most similar to that of barium (Ba) among various known donor-type dopants, a dielectric composition capable of minimizing lattice mismatch and allowing high permittivity was developed.

Additionally, as it is general that insulation resistance (IR) is reduced and reduction resistance is not easily secured when contents of donor-type additives increase, an appropriate content ratio is to be determined.

Conventionally, dysprosium (Dy) is a most commonly used donor-type dopant, which influences the improvement of permittivity and reliability of the multilayer ceramic capacitor. By appropriately adjusting contents of such a donor-type dopant and an acceptor-type dopant, demanded dielectric characteristics and reliability can be achieved.

Although Dy is substituted at an A-site of $BaTiO_3$ to suppress oxygen vacancy, the achievement of such characteristics is limited, due to solid solution limitations in the element barium (Ba).

Accordingly, it is necessary to allow a rare-earth element to be more smoothly substituted in the element Ba so that such solid solution effect is maximized.

Specifically, it is necessary to use a rare-earth element which has a greater valence than Dy whose ion size is similar to that of Ba and larger than that of Dy in order to increase a donor effect.

In the present disclosure, a dielectric composition including cerium (Ce), a rare-earth element having a valence of 4 or more, capable of defect-chemically inhibiting oxygen vacancy generation in a composition of the dielectric or lowering an oxygen vacancy concentration was invented.

As Ce has a longer ionic radius than the element barium (Ba), which is the main ingredient of the dielectric composition, and the element Dy, which is a donor-type dopant and has anionic radius similar to that of the element Ba, Ce can be effectively substituted at a Ba-site.

In addition, the element Ce has a high valence and can thus effectively remove oxygen vacancy as a donor.

In an embodiment, an optimal content ratio has been determined to secure high permittivity and excellent reliability by applying Ce in addition to Dy, which show stable dielectric characteristics.

According to an embodiment, the dielectric ceramic composition includes a $BaTiO_3$-based base material main ingredient and an accessory ingredient, where the accessory ingredient includes Dy and Ce as the first accessory ingredients. A total content of Dy and Ce is greater than 0.25 mol % and equal to or less than 1.0 mol % based on 100 mol % of the base material main ingredient.

The high permittivity may be obtained and the reliability such as insulation resistance may be improved by adjusting the total content of Dy and Ce to be greater than 0.25 mol % and equal to or less than 1.0 mol % based on 100 mol % of the base material main ingredient.

According to an embodiment, the dielectric ceramic composition included in the dielectric layers in the ceramic body includes Dy and Ce, rare-earth elements, as the accessory ingredients. By adjusting the Dy and Ce contents, high dielectric characteristics can be obtained and reliability such as insulation resistance can be improved.

When the total content of Dy and Ce is equal to or less than 0.25 mol % based on 100 mol % of the base material main ingredient, the content of the rare-earth elements may be insufficient, thereby giving rise to reduced reliability under a high temperature and high pressure environment.

In other words, when the total content of Dy and Ce is equal to or less than 0.25 mol % based on 100 mol % of the base material main ingredient, the rare-earth elements are substituted at the A-site, and the suppression of oxygen vacancy becomes insignificant. This will deteriorate reliability, thereby giving rise to insignificantly improved permittivity.

Meanwhile, when the total content of Dy and Ce is greater than 1.0 mol % based on 100 mol % of the base material main ingredient, the content of the rare-earth elements acting as a donor increases, and so does an electron concentration. This may serve to reduced insulation resistance due to semiconductorization.

According to an embodiment, the Ce content in the dielectric ceramic composition may satisfy 0.233 mol %≤Ce≤0.932 mol % based on 100 mol % of the base material main ingredient.

High dielectric characteristics can be obtained and the reliability such as insulation resistance can be improved by adjusting the Ce content to satisfy 0.233 mol %≤Ce≤0.932 mol % based on 100 mol % of the base material main ingredient.

In particular, by adjusting the Ce content to satisfy 0.466 mol %≤Ce≤0.932 mol % based on 100 mol % of the base material main ingredient, high dielectric characteristics can be obtained and reliability, such as insulation resistance, can be improved.

When the Ce content is equal to or less than 0.233 mol % based on 100 mol % of the base material main ingredient, permittivity does not significantly increase compared to a conventional dielectric ceramic composition containing Dy only.

As in an embodiment of the present disclosure, however, when the Ce content is greater than 0.233 mol % based on 100 mol % of the base material main ingredient, oxygen vacancy can be more effectively removed compared to Dy. Accordingly, domain wall mobility is improved, and high permittivity can thus be achieved.

When the Ce content is greater than 0.932 mol % based on 100 mol % of the base material main ingredient, however, the content of the rare-earth elements functioning as a donor increases, and so does the electron concentration. This may serve to reduced insulation resistance due to semiconductorization.

According to an embodiment, the first accessory ingredient further includes an oxide or carbonate containing lanthanum (La), which may be disposed at a boundary of the dielectric grain.

Meanwhile, when a rare-earth element, such as La, whose ion radius is bigger than that of Dy, is used, a Ba-site can be more effectively substituted, thereby making it more effective on oxygen vacancy concentration reduction.

Accordingly, La may be further included as the first accessory ingredient to secure insulation resistance, while minimizing the oxygen vacancy concentration to improve the reliability.

However, if the La content is too high, insulation resistance may be rapidly degraded by excessive semiconductorization. Accordingly, it is preferable that the content of La is 0.233 mol % or above and 0.699 mol % or less based on 100 mol % of the base material main ingredient.

As previously described, the multilayer ceramic capacitor 100 according to an embodiment is a miniaturized product with high capacity and includes a dielectric layer 111 having a thickness of 0.4 µm or less and the first and second electrodes 121 and 122 having a thickness of 0.4 µm or less, but the thickness is not limited thereto.

Additionally, a size of the multilayer ceramic capacitor 100 may be 1005 (length×width, 1.0 mm×0.5 mm) or less.

In other words, as the multilayer ceramic capacitor 100 according to an embodiment is a miniaturized product with high capacity, the thicknesses of the dielectric layers 111 and the first and second internal electrodes 121 and 122 are thinner than those of related art products. With respect to such a product to which thin film dielectric layers and internal electrodes are applied, research for improving reliability such as insulation resistance is a very important issue.

In other words, as related art multilayer ceramic capacitors have comparatively thicker dielectric layers and internal electrodes compared to the multilayer ceramic capacitor according to an embodiment of the present disclosure, reliability is not a big issue even though a composition of the dielectric ceramic composition is the same as the related art.

However, in regard to a product of a multilayer ceramic capacitor to which thin film dielectric layers and internal electrodes are applied as an embodiment of the present disclosure, reliability of the multilayer ceramic capacitor is important, and it is necessary to adjust the composition of the dielectric ceramic composition.

That is, in an embodiment, even when the dielectric layer 111 is a thin film having a thickness of 0.4 µm or less, reliability such as insulation resistance can be improved by containing as the first accessory ingredients Dy and Ce in an amount greater than 0.25 mol % and equal to or less than 1.0 mol % based on 100 mol % of the base material main ingredient. By adjusting the Ce content to satisfy 0.233 mol %≤Ce≤0.932 mol % based on 100 mol % of the base material main ingredient, reliability such as insulation resistance can be improved even when the dielectric layer 111 is a thin film having a thickness of 0.4 µm or less.

However, the thin film does not mean that the thicknesses of the dielectric layers 111 and internal electrodes and 122 are 0.4 µm or less, and may be understood in a sense that the dielectric layers and internal electrodes are thinner than those of related art products.

Hereinafter, each ingredient of the dielectric ceramic composition according to an embodiment will be described in more details.

(a) Base Material Main Ingredient

The dielectric ceramic composition according to an embodiment of the present disclosure may include a base material main ingredient represented by $BaTiO_3$.

According to an embodiment, the base material main ingredient includes at least one selected from the group consisting of $BaTiO_3$, $(Ba_{1-x}Ca_x)(Ti_{1-y}Ca_y)O_3$ (where $0 \leq x \leq 0.3$, $0 \leq y \leq 0.1$), $(Ba_{1-x}Ca_x)(Ti_{1-y}Zr_y)O_3$ (where $0 \leq x \leq 0.3$, $0 \leq y \leq 0.5$), and $Ba(Ti_{1-y}Zr_y)O_3$ (where $0 \leq y \leq 0.5$), but is not necessarily limited thereto.

The dielectric ceramic composition according to an embodiment may have room-temperature permittivity of 2000 or above.

The base material main ingredient is not particularly limited, but an average diameter of the main ingredient powder may be 40 nm or above and 150 nm or less.

b) First Accessory Ingredient

According to an embodiment of the present disclosure, the dielectric ceramic composition essentially includes Dy and Ce as elements of the first accessory ingredients and may additionally include 0.233 mol % or more and 0.699 mol % or less of a lanthanum (La) oxide or carbonate based on 100 mol % of the base material main ingredient.

The first accessory ingredient serves to inhibit reliability deterioration of the multilayer ceramic capacitor to which the dielectric ceramic composition is applied in an embodiment.

When the La content is less than 0.233 mol %, the permittivity does not increase. When the La content exceeds 0.699 mol %, the insulation resistance or dissipation factor (DF) may degrade.

According to an embodiment, reliability such as insulin resistance may be improved even when the thickness of the dielectric layer 111 is 0.4 μm or less by containing Dy and Ce as the first accessory ingredients in an amount greater than 0.25 mol % and equal to or less than 1.0 mol % based on 100 mol % of the base material main ingredient and adjusting the Ce content present in the dielectric ceramic composition to satisfy 0.233 mol % $\leq$ Ce $\leq$ 0.932 mol % based on 100 mol % of the base material main ingredient, particularly 0.466 mol % $\leq$ Ce $\leq$ 0.932 mol %.

When the Ce content is equal to or less than 0.233 mol % based on 100 mol % of the base material main ingredient, permittivity does not significantly increase compared to a conventional dielectric ceramic composition containing Dy only.

When the Ce content is equal to or greater than 0.932 mol % based on 100 mol % of the base material main ingredient, insulation resistance may be reduced due to semiconductorization.

c) Second Accessory Ingredient

According to an embodiment of the present disclosure, the dielectric ceramic composition may include an oxide including at least one element selected from the group consisting of manganese (Mn), vanadium (V), chromium (Cr), iron (Fe), nickel (Ni), cobalt (Co), copper (Cu) and zinc (Zn) or a carbonate comprising at least one element selected from the group consisting of Mn, V, Cr, Fe, Ni, Co, Cu and Zn as the second accessory ingredient.

As the second accessory ingredient, the oxide including at least one element selected from the group consisting of Mn, V, Cr, Fe, Ni, Co, Cu and Zn and the carbonate including at least one element selected from the group consisting of Mn, V, Cr, Fe, Ni, Co, Cu and Zn may be included in an amount of 0.1 mol to 2.0 mol based on 100 mol of the base material main ingredient.

The second accessory ingredient serves to lower a firing temperature and enhance high temperature-withstand voltage characteristics of the multilayer ceramic capacitor to which the dielectric ceramic composition is applied.

The contents of the second accessory ingredient and third and fourth accessory ingredients that will be described may be amounts contained in the dielectric ceramic composition based on 100 mol of the base material powder, and in particular, may be defined as moles of metal ions in which respective accessory ingredients are contained.

When the content of the second accessory ingredient is less than 0.1 mol, the firing temperature increases and high temperature-withstand voltage characteristics may somewhat decrease.

When the content of the second accessory ingredient is greater than 2.0 mol, the high temperature-withstand voltage characteristics and room-temperature specific resistance may be reduced.

In particular, the dielectric ceramic composition according to an embodiment of the present disclosure may include 0.1 mol to 2.0 mol of the second accessory ingredient based on 100 mol of the base material main ingredient. This will enable the firing at a low temperature and provide high temperature-withstand voltage characteristics.

Third Accessory Ingredient

According to an embodiment of the present disclosure, the dielectric ceramic composition may include a third accessory ingredient, which is an oxide or carbonate including a fixed-valence acceptor element of magnesium (Mg).

The fixed-valence acceptor element Mg may be included as the third accessory ingredient in an amount of 0.001 mol to 0.5 mol based on 100 mol of the base material main ingredient.

The third accessory ingredient, as a fixed-valence acceptor element or compounds including the same, serves as an acceptor to decrease an electron concentration. The reliability improvement effect due to n-type may be significantly increased by adding 0.001 mol to 0.5 mol of the fixed-valence acceptor element Mg, which is the third accessory ingredient, based on 100 mol of the base material main ingredient.

When the content of the third accessory ingredient is greater than 0.5 mol based on 100 mol of the base material main ingredient, the permittivity may decrease, which may be problematic.

According to an embodiment, however, it is preferable that in order to maximize the reliability improvement resulting from the n-type, 0.5 mol of the third accessory ingredient be included based on 100 mol of Ti, but it is not limited thereto. The third accessory ingredient may be included in an amount of 0.5 mol or less or a little more than 0.5 mol.

Fourth Accessory Ingredient

According to an embodiment of the present disclosure, the dielectric ceramic composition may include, as the fourth accessory ingredient, an oxide including at least one element of silicon (Si) or aluminum (Al), or a glass compound including Si.

The dielectric ceramic composition may further include 0.001 mol to 4.0 mol of the fourth accessory ingredient, which includes an oxide containing at least one element of Si or Al, or a glass compound containing Si, based on 100 mol of the base material main ingredient.

The fourth accessory ingredient content may be the content of at least one element of Si and Al contained in the fourth accessory ingredient, regardless of an additional form such as glass, an oxide or a carbonate.

The fourth accessory ingredient serves to lower a firing temperature and improve high-temperature withstand voltage characteristics of the multilayer ceramic capacitor to which the dielectric ceramic composition is applied.

When the fourth accessory ingredient content exceeds 4.0 mol based on 100 mol of the base material main ingredient, there may be problems such as decreased sinterability and density, secondary phase formation, or the like, which may be problematic.

In particular, according to an embodiment, when the dielectric ceramic composition contains 4.0 mol or less of Al, grain growth may be controlled to be uniform, thereby improving withstand voltage and reliability as well as DC-bias characteristics.

Hereinafter, the present disclosure will be described in more detail with respect to the embodiments of the present disclosure and comparative examples. These embodiments and comparative examples are provided to assist in a comprehensive understanding of the invention, and should not be construed as being limited to the embodiments set forth herein.

Embodiment Examples

A dielectric layer was formed by adding an additive such as Dy, Ce, La, Al, Mg, Mn, or the like, a binder and an organic solvent, such as ethanol, to a dielectric powder containing $BaTiO_3$, and wet-mixing the same to prepare a dielectric slurry followed by spreading and dying the dielectric slurry on a carrier film to prepare a ceramic green sheet.

All element additives having a particle size of 40% or less based on $BaTiO_3$ were mono-dispersed and added.

In particular, among the rare-earth elements added to the dielectric slurry, the Dy and Ce were added in an amount greater than 0.25 mol and equal to or less than 1.0 mol % based on 100 mol % of the base material main ingredient.

In Embodiment Example 1, 0.466 mol % of Dy and 0.466 mol % of Ce were added to the dielectric slurry, whereas 0.233 mol % of Dy and 0.699 mol % of Ce were added to the dielectric slurry in Embodiment Example 2.

The ceramic green sheet was prepared as a sheet having a thickness of several micrometers by mixing the ceramic powder, a binder and a solvent to prepare slurry and using the slurry subjected to a doctor blade method.

Then, a conductive paste for internal electrodes including 40 parts by weight to 50 parts by weight of nickel powder having an average particle size of 0.1 μm to 0.2 μm was prepared.

The conductive paste for internal electrodes was screen-printed on the ceramic green sheets to form internal electrodes. The green sheets on which internal electrode patterns were formed were then laminated to form a laminate followed by compressing and cutting the laminate.

Then, the cut laminate was heated to remove the binder, and fired in a high-temperature reducing atmosphere to form a ceramic body.

During the firing process, a heat treatment was performed by firing in a reducing atmosphere (0.1% $H_2$/99.9% $N_2$, $H_2O/H_2/N_2$) at 1100° C. to 1200° C. for 2 hours followed by re-oxidation in a nitrogen ($N_2$) atmosphere at 1000° C. for 3 hours.

A copper (Cu) paste was used to perform a termination process and electrode firing for the fired ceramic body, and external electrodes were formed.

In addition, the dielectric layers 111 and the first and second internal electrodes 121 and 122 inside the ceramic body 110 were manufactured to have a thickness of 0.4 μm or less after firing.

Comparative Example 1

Comparative Example 1 represents a conventional case, in which 0.932 mol % of Dy was added based on 100 mol % of the base material main ingredient. The remaining manufacturing process was the same as that described in the Embodiment Examples.

Comparative Example 2

In Comparative Example 2, 0.699 mol % of Dy and 0.233 mol % of Ce were added based on 100 mol % of the base material main ingredient. The remaining manufacturing process was the same as that described in the Embodiment Examples.

Comparative Example 3

In Comparative Example 3, 0.932 mol % of Ce was added based on 100 mol % of the base material main ingredient. The remaining manufacturing process was the same as that described in the Embodiment Examples.

Permittivity, dissipation factor (DF) and insulation resistance (IR) were tested for Embodiment Examples 1 and 2 and Comparative Examples 1 to 3, which are prototype multi-layer ceramic capacitor (MLCC) samples manufactured as above, and results thereof were evaluated.

The tests were carried out to accurately measure the effect of Ce addition under the following two conditions, that is, a ceramic condition and a multilayer ceramic capacitor condition.

Table 1 below shows permittivity, DF and IR of chips of the ceramic and prototype MLCC according to the experimental examples (Embodiment Examples 1 and 2 and Comparative Examples 1 to 3).

TABLE 1

|  | TEST1 | | | TEST2 | | |
| --- | --- | --- | --- | --- | --- | --- |
|  | Permittivity | DF | IR | Permittivity | DF | IR |
| Comp Ex. 1 | 2,277 | 1.9% | 6.5E+12 | 2,433 | 2.3% | 3.06E+10 |
| Comp Ex. 2 | 2,528 | 2.0% | 4.8E+12 | 2,597 | 2.1% | — |
| Ex. 1 | 2,776 | 1.9% | 2.3E+12 | 2,807 | 2.0% | 6.49E+10 |
| Ex. 2 | 3,004 | 1.9% | 1.5E+12 | 3,054 | 1.9% | 5.16E+10 |
| Comp Ex. 3 | 3,321 | 2.2% | 8.2E+11 | 3,335 | 2.2% | 2.58E+10 |

Referring to Table 1, Comparative Example 1, in which 0.932 mol % of Dy is added to the dielectric ceramic composition based on 100 mol % of the base material main ingredient, showed low permittivity and insulation resistance.

Comparative Example 2, in which the Ce content was equal to or less than 0.233 mol % based on 100 mol % of the base material main ingredient, showed insignificantly improved permittivity compared to Comparative Example 1 in which Dy was only employed.

Comparative Example 3, in which the Ce content was equal to or greater than 0.932 mol based on 100 mol % of the base material main ingredient, showed a tendency to be subject to semiconductorization and reduced IR and had an issue with DF.

In contrast, the Dy and Ce contents of Embodiment Examples 1 and 2 were greater than 0.25 mol % and equal to or less than 1.0 mol % based on 100 mol % of the base material main ingredient, which satisfies 0.233 mol %≤Ce≤0.932 mol %, in particular, 0.466 mol %≤Ce≤0.932 mol %, based on 100 mol % of the base material main ingredient. This gives rise to high permittivity and improved reliability such as insulation resistance, or the like.

Figure 3:
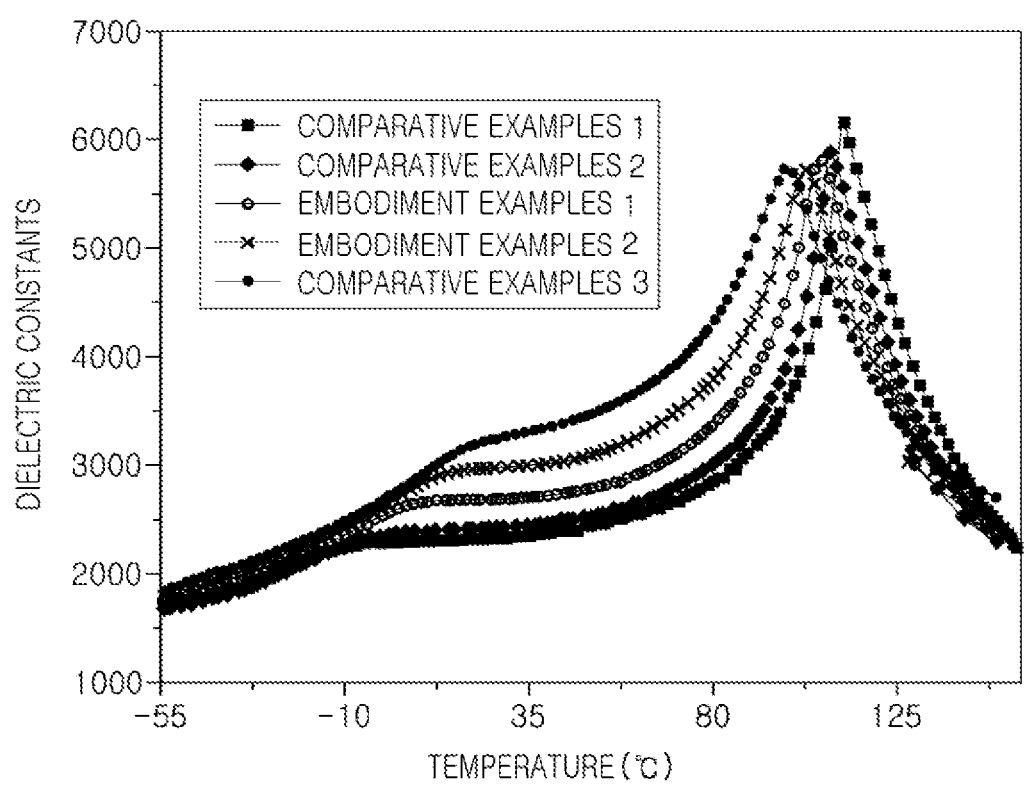
FIG. 3 is a graph showing a result of dielectric constants with respect to temperature according to the Embodiment Examples and Comparative Examples.

FIG. 3 is a graph showing a result of dielectric constants with respect to temperature according to the Embodiment Examples and Comparative Examples.

Referring to FIG. 3, Embodiment Examples 1 and 2, in which the Dy and Ce contents is greater than 0.25 mol % and equal to or less than 1.0 mol % based on 100 mol % of the base material main ingredient and the Ce content satisfies 0.233 mol %≤Ce≤0.932 mol %, in particular, 0.466 mol %≤Ce≤0.932 mol %, based on 100 mol % of the base material main ingredient, showed significantly improved permittivity with respect to temperature compared to Comparative Example 1 in which only Dy was employed.

Meanwhile, Comparative Example 3, in which the Ce content was 0.932 mol % based on 100 mol % of the base material main ingredient, showed high permittivity; however, there was a tendency for semiconductorization, which may cause reduced insulation resistance, thereby rising an issue with the reliability.

According to an embodiment, the dielectric ceramic composition can have improved reliability such as improved insulation resistance by including as an accessory ingredient a novel rare-earth element Ce while controlling the content thereof.

While embodiments have been shown and described above, it will be apparent to those skilled in the art that modifications and variations could be made without departing from the scope of the present disclosure as defined by the appended claims.

What is claimed is:

1. A multilayer ceramic capacitor, comprising:
   a ceramic body comprising dielectric layers and first and second internal electrodes disposed to face each other with respective dielectric layers interposed therebetween; and
   a first external electrode and a second external electrode disposed on external surfaces of the ceramic body, the first external electrode being electrically connected to the first internal electrode and the second external electrode being electrically connected to the second internal electrode,
   wherein the dielectric layers comprise dielectric grains comprising a dielectric ceramic composition,
   the dielectric ceramic composition comprises a barium titanate (BaTiO$_3$)-based base material main ingredient and an accessory ingredient,
   the accessory ingredient comprises a first accessory ingredient comprising dysprosium (Dy) and cerium (Ce),
   a total content of Dy and Ce is greater than 0.24 mol and equal to or less than 1.0 mol based on 100 mol of the base material main ingredient,
   the dielectric ceramic composition comprises 0.001 mol to 0.5 mol of a third accessory ingredient based on 100 mol of the base material main ingredient, and
   the third accessory ingredient comprises magnesium (Mg).

2. The multilayer ceramic capacitor of claim 1, wherein the content of Ce satisfies 0.233 mol≤Ce≤0.932 mol based on 100 mol of the base material main ingredient.

3. The multilayer ceramic capacitor of claim 1, wherein the first accessory ingredient further comprises lanthanum (La),
   wherein the La is disposed at a boundary of the dielectric grains.

4. The multilayer ceramic capacitor of claim 1, wherein the dielectric ceramic composition comprises 0.1 mol to 2.0 mol of a second accessory ingredient based on 100 mol of the base material main ingredient,
   wherein the second accessory ingredient comprises at least one element selected from the group consisting of manganese (Mn), vanadium (V), chromium (Cr), iron (Fe), nickel (Ni), cobalt (Co), copper (Cu) and zinc (Zn).

5. The multilayer ceramic capacitor of claim 1, wherein the dielectric ceramic composition comprises 0.001 mol to 4.0 mol of a fourth accessory ingredient based on 100 mol of the base material main ingredient,
   wherein the fourth accessory ingredient comprises at least one element of silicon (Si) or aluminum (Al).

6. The multilayer ceramic capacitor of claim 1, wherein a thickness of at least one of the dielectric layers is 0.4 µm or less.

7. The multilayer ceramic capacitor of claim 1, wherein a size of the multilayer ceramic capacitor is 1005 (length× width, 1.0 mm×0.5 mm) or less.

8. The dielectric ceramic composition of claim 1, wherein the content of Ce satisfies 0.466 mol≤Ce≤0.932 mol based on 100 mol of the base material main ingredient.

9. The dielectric ceramic composition of claim 1, wherein the dielectric ceramic composition comprises La in an amount of 0.233 mol or more and 0.699 mol or less based on 100 mol of the base material main ingredient.

10. The multilayer ceramic capacitor of claim 1, wherein a thickness of at least one of the first and second internal electrodes is 0.4 µm or less.

11. The multilayer ceramic capacitor of claim 1, wherein a thickness of at least one of the dielectric layers is 0.4 µm or less, and a thickness of at least one of the first and second internal electrodes is 0.4 µm or less.

12. A multilayer ceramic capacitor, comprising:
   a ceramic body comprising dielectric layers and first and second internal electrodes disposed to face each other with respective dielectric layers interposed therebetween; and
   a first external electrode and a second external electrode disposed on external surfaces of the ceramic body, the first external electrode being electrically connected to the first internal electrode and the second external electrode being electrically connected to the second internal electrode,
   wherein the dielectric layers comprise dielectric grains comprising a dielectric ceramic composition,
   the dielectric ceramic composition comprises a barium titanate (BaTiO$_3$)-based base material main ingredient and an accessory ingredient,
   the accessory ingredient comprises a first accessory ingredient comprising dysprosium (Dy) and cerium (Ce),
   a total content of Dy and Ce is greater than 0.24 mol and equal to or less than 1.0 mol based on 100 mol of the base material main ingredient,
   the first accessory ingredient further comprises lanthanum (La) in an amount of 0.233 mol or more and 0.699 mol or less based on 100 mol of the base material main ingredient, the accessory ingredient further comprises 0.001 mol to 4.0 mol of a fourth accessory ingredient based on 100 mol of the base material main ingredient, and
the fourth accessory ingredient comprises aluminum (Al).

13. The multilayer ceramic capacitor of claim 12, wherein the content of Ce satisfies 0.233 mol≤Ce≤0.932 mol based on 100 mol of the base material main ingredient.

14. The multilayer ceramic capacitor of claim 12, wherein the dielectric ceramic composition comprises 0.1 mol to 2.0 mol of a second accessory ingredient based on 100 mol of the base material main ingredient,
wherein the second accessory ingredient comprises at least one element selected from the group consisting of manganese (Mn), vanadium (V), chromium (Cr), iron (Fe), nickel (Ni), cobalt (Co), copper (Cu) and zinc (Zn).

15. The multilayer ceramic capacitor of claim 12, wherein the dielectric ceramic composition comprises 0.001 mol to 0.5 mol of a third accessory ingredient based on 100 mol of the base material main ingredient,
wherein the third accessory ingredient comprises magnesium (Mg).

16. The multilayer ceramic capacitor of claim 12, wherein the fourth accessory ingredient further comprises Si.

17. The multilayer ceramic capacitor of claim 12, wherein a thickness of at least one of the dielectric layers is 0.4 μm or less.

18. The multilayer ceramic capacitor of claim 12, wherein a size of the multilayer ceramic capacitor is 1005 (length× width, 1.0 mm×0.5 mm) or less.

19. The multilayer ceramic capacitor of claim 12, wherein a thickness of at least one of the first and second internal electrodes is 0.4 μm or less.

20. The multilayer ceramic capacitor of claim 12, wherein a thickness of at least one of the dielectric layers is 0.4 μm or less, and a thickness of at least one of the first and second internal electrodes is 0.4 μm or less.

* * * * *